United States Patent
Schmitt et al.

(10) Patent No.: US 7,043,528 B2
(45) Date of Patent: May 9, 2006

(54) SYSTEMS AND METHODS FOR CONNECTING VIDEO CONFERENCING TO A DISTRIBUTED NETWORK

(75) Inventors: Matthew R. Schmitt, Columbus, OH (US); Nicholas A. Poolos, Columbus, OH (US)

(73) Assignee: Starbak Communications, Inc., Waltham, MA (US)

( * ) Notice: Subject to any disclaimer, the term of this patent is extended or adjusted under 35 U.S.C. 154(b) by 0 days.

(21) Appl. No.: 11/161,701

(22) Filed: Aug. 12, 2005

(65) Prior Publication Data

US 2006/0047750 A1    Mar. 2, 2006

Related U.S. Application Data

(63) Continuation of application No. 09/984,499, filed on Oct. 30, 2001.

(60) Provisional application No. 60/273,825, filed on Mar. 8, 2001.

(51) Int. Cl.
    *G06F 15/16* (2006.01)
(52) U.S. Cl. .................. 709/204; 709/231; 709/232
(58) Field of Classification Search ............ 709/204, 709/231, 232
    See application file for complete search history.

(56) References Cited

U.S. PATENT DOCUMENTS

| | | | |
|---|---|---|---|
| 5,625,407 A * | 4/1997 | Biggs et al. ............. 348/14.11 |
| 5,802,281 A * | 9/1998 | Clapp et al. ................ 709/228 |
| 6,195,683 B1 * | 2/2001 | Palmer et al. .............. 709/204 |
| 6,317,776 B1 * | 11/2001 | Broussard et al. .......... 709/204 |
| 6,335,927 B1 * | 1/2002 | Elliott et al. ................ 370/352 |
| 6,380,968 B1 | 4/2002 | Alexander et al. |
| 6,421,706 B1 * | 7/2002 | McNeill et al. ............. 709/204 |
| 6,421,733 B1 | 7/2002 | Tso et al. |
| 6,496,201 B1 * | 12/2002 | Baldwin et al. ............ 715/753 |
| 6,760,749 B1 * | 7/2004 | Dunlap et al. .............. 709/204 |
| 6,816,468 B1 * | 11/2004 | Cruickshank ............... 370/260 |
| 6,879,565 B1 * | 4/2005 | Baxley et al. .............. 370/261 |
| 2002/0033880 A1 | 3/2002 | Sul et al. |
| 2002/0112004 A1 | 8/2002 | Reid et al. |
| 2003/0172131 A1 | 9/2003 | Ao |
| 2004/0071098 A1 | 4/2004 | Magnuski |

* cited by examiner

*Primary Examiner*—Ario Etienne
*Assistant Examiner*—Ciara Martin
(74) *Attorney, Agent, or Firm*—Hahn Loeser & Parks LLP

(57) ABSTRACT

A data capture module can be connected to a multi-point control unit managing a video conference session just as the end point of a participant to the video conference session is connected. The data capture module receives the video and/or audio digital data content just as the participating end points receive the video and/or audio digital data content, via a video conference standard protocol technique. The data capture module is connected to a streaming module, which may be connectable to many data capture modules, each acting as a pseudo-participant in a different video conference session. The streaming module converts and transmits the received digital data as a multicast to one or more unicast servers, which in turn transmit to zero, one, or more multicast clients via a multimedia streaming protocol technique.

18 Claims, 7 Drawing Sheets

PRIOR ART

US 7,043,528 B2

SYSTEMS AND METHODS FOR CONNECTING VIDEO CONFERENCING TO A DISTRIBUTED NETWORK

CROSS REFERENCE TO RELATED APPLICATIONS/INCORPORATION BY REFERENCE

This patent application is a continuation patent application of U.S. patent application Ser. No. 09/984,499 filed on Oct. 30, 2001 which is incorporated herein by reference in its entirety.

TECHNICAL FIELD OF THE INVENTION

Certain embodiments of the present invention relate to systems and methods that allow digital data to be transmitted between a video conference system and a distributed network. In particular, certain embodiments of the present invention relate to taking video and/or audio digital data content from a video conference session, which uses a video conference standard protocol technique, and distribute the video and/or audio digital data content onto a distributed network which uses at least one multimedia streaming protocol technique.

BACKGROUND OF THE INVENTION

Conventional video conferencing equipment is generally divided into a number of categories. These categories include display and capture equipment, such as cameras, microphones, televisions and speakers, end point equipment that connects a particular video conference participant to another end point device or to a multi-point control unit, and the multi-point control unit, which allows three or more end point devices to participate in a single video conference session.

The end point equipment is used by participants in a video conference session to convert the audio and video signals from the camera and microphone into data transmittable to another end point device or the multi-point control unit. The end point equipment is also used to convert the transmitted audio and video signals, received at one end point from another end point or from the multi-point control unit, into signals usable by audio and video display devices connected to that end point to play the video and audio signals to the participants.

The multi-point control unit is a conference bridge that connects the various end points of a single video conference session together when more than two end point devices are to be involved in the video conference. In general, two end point devices can be connected directly to each other. In practice, most video conference sessions, even when only two participants are involved, are routed through a multi-point control device. In general, one multi-point control unit can be used for a number of video conference sessions, where each session has two or more participants. In operation, each of the end points contact the multi-point control unit. After data sufficient for the multi-point control unit to authenticate the participants' authorization to participate in a video conference session is provided to that multi-point control unit, the multi-point control unit connects that end point device to the one or more other end point devices, so that the user of that end point device can participate in that video conference session. The multi-point control unit, or a video conference administrator or coordinator, confirms a video conference participants' authorization to participate in the video conference session based on the video conference participant supplying a predefined password, or the like.

The H.320 standard is the standard for ISDN video conferencing. The H.323 standard extends the H.320 ISDN video conferencing standards to a standard usable for Internet protocol (IP)-based distributed networks. The Session Initiation Protocol (SIP) is a third video conferencing standard protocol. Video conference equipment, which uses the H.323 standard, uses standard Internet Protocol (IP) handshake and messaging protocols and data and packet formats that would be used on a standard Internet protocol (IP)-based distributed network, such as the Internet, many wide area networks and local area networks, intranets, extranets, and other distributed networks.

Porting the audio and video data signals of a video conference session to a distributed network, such as the Internet, for distribution as a multimedia data stream is known. Conventional video conference broadcasters re-encode the audio and video portions of the video conference through one of two techniques. One technique includes capturing the video portion of the video conference separately, by accessing the analog auxiliary audio and video outputs on one of the video conference end point devices that are being used to participate in a particular video conference session. The first technique is illustrated in FIG. 1.

A second technique uses an entirely different type of video conference equipment, which allows three or more participants to participate in a video conference without needing a multi-point control unit. This system connects the end point equipment of the various participants in a peer-to-peer style network, where each end point receives the video and audio data signals directly from each of the other end points. This is described as multi-tasking the video conference across the network. In this case, an IPTV client, which is a software application available from Cisco Systems, can be connected to the network to view the data packets of a video conference session as the data packets are passed back and forth between the actual end points participating in the video conference session. The IPTV client sits in the background and monitors all of the packets that are transmitted between the end points of the video conference session.

One advantage of the second system over the first technique is that the audio and video data signals stay in digital form. However, the IPTV client merely listens to the multi-task IP addresses. Thus, there is no centralized streaming server that is able to output a unicast multimedia data stream to a client. Rather, the IPTV client creates a multicast. However, multicasts generally cannot be received by most conventional local area or wide area networks that the video conference session has not originated on. Thus, this peer-to-peer system can only be used within a multi-cast capable network, such as a single local or wide area network. As a result, the IPTV client can only make the video conference data available to another IPTV client that is also on a multi-cast capable network.

The system shown in FIG. 1 accesses the digital video and audio signals of the video conference session output by a video conference end point device 60 through the analog output signals output by a video conference standard client 70. These analog output signals are also used to drive the audio and visual display devices used by the actual video conference participants. The system shown in FIG. 1 reconverts the audio signals back into digital data streams. As a result, the system shown in FIG. 1 can significantly degrade or otherwise distort the video and audio data.

Additionally, the video and audio data, which is originally in digital format, is converted to analog format and then reconverted to digital format. As a result, there is a significant delay between receiving the digital video and audio signals at the video conference end point device 60 and transmitting the re-encoded digital video and audio streams. The latency can be as long as 40 seconds. Finally, the system shown in FIG. 1 requires a physical connection between the video conference standard client 70 and a video capture encoding device 80 to transmit analog signals 72 and 74. As a result, each video capture encoding device 80 can be connected to at most one client 70.

BRIEF SUMMARY OF THE INVENTION

Embodiments of the present invention provide systems and methods that allow video conference data content to be transmitted between the video conference session participants and clients on a distributed network.

Embodiments of the present invention separately provide systems and methods that allow the transmitted data content to remain in digital form as the data content is transmitted between the video conference session participants and the clients on the distributed network.

Embodiments of the present invention separately provide systems and methods that allow the transmitted data content to be transmitted as a unicast on the distributed network.

Embodiments of the present invention separately provide systems and methods that use a pseudo-end point (i.e., a data capture module) to receive audio and video data content transmitted between the end point devices actually participating in the video conference session.

Embodiments of the present invention separately provide systems and methods that transmit the audio and video data content from the pseudo-end point device (i.e., data capture module) to clients on a distributed network.

Embodiments of the present invention separately provide systems and methods that transmit the audio and video data content from the pseudo-end point device to clients on a distributed network entirely as digital data.

Embodiments of the present invention separately provide systems and methods that recode the digital audio and video data content received by the pseudo-end point device, while the audio and video data content remain in digital format.

Embodiments of the present invention separately provide systems and methods that use a pseudo-end point unit (i.e., a data capture module) such that the access to the video conference session data is controlled in the same way that access is controlled for an actual video conference session participant.

Embodiments of the present invention separately provide systems and methods that use a pseudo-end point device to inject audio and video data content stored on the distributed network into the video conference session.

In various exemplary embodiments of the systems and methods according to the present invention, a pseudo-end point device can be connected to a multi-point control unit managing a particular video conference session in the same way as the end point device of an actual participant to the video conference session is connected to that multi-point control unit. The pseudo-end point device receives the digital video conference data packets in the same way that the end point devices of the actual participants receive the digital video conference data packets.

In various exemplary embodiments, the pseudo-end point device is connected to a video conference standard module (i.e., a streaming module). The streaming module can be connected to a plurality of different pseudo-end point devices (i.e., data capture modules), each acting as a pseudo-participant in a different video conference session. In various exemplary embodiments, the streaming module transmits the received audio and data packets as a multicast to one or more unicast servers, and zero, one or more multicast clients.

In various exemplary embodiments, the unicast servers include servers able to output unicast multimedia data streams using any known or later-developed protocol or software package, such as, for example, the Microsoft® Windows® Media Server protocol (Windows® MMS), the Apple® QuickTime® protocol, the Real Networks® Real® protocol, the Internet Engineering Task Force (IETF) Real Time Streaming Protocol (RTSP), or the like.

These and other features and advantages are described in, or are apparent from, the following detailed description of various exemplary embodiments of the systems and methods according to the present invention.

BRIEF DESCRIPTION OF THE DRAWINGS

Various exemplary embodiments of the present invention will be described in detail, with reference to the following figures, wherein.

DETAILED DESCRIPTION OF EXEMPLARY EMBODIMENTS OF THE PRESENT INVENTION

The video conferencing systems and methods, according to embodiments of the present invention, allow video conferencing systems and Internet-based media streaming systems to converge. In various exemplary embodiments, the systems and methods according to the present invention allow the audio and video digital data content of a video conference session to be distributed as a multimedia data stream signal over a distributed network, such as the Internet, using at least one multimedia streaming protocol technique. In general, the various exemplary embodiments of the systems and methods according to the present invention allow a network administrator or video conference coordinator to broadcast a live video conference session using standard video streaming techniques and protocols for distributing video streams over distributed networks. This makes use of existing distributed network infrastructures while reducing initial purchase costs, maintenance requirements, and installation costs.

As used herein, the term "video conference standard" encompasses the H.323 video conference standard protocol, the SIP video conference standard protocol, the H.320 video conference standard protocol, and any other known or later-developed video conference standard protocol that provides for the concept of a video conference session. Such video conference standards will usually provide for one or more of some form of call routing, some form of call signaling and alerting, some form of negotiation regarding the capabilities of the video conference end points and the parameters to be used during the video conference, and some form of resource releasing of the resources allocated to the video conference.

Figure 1:
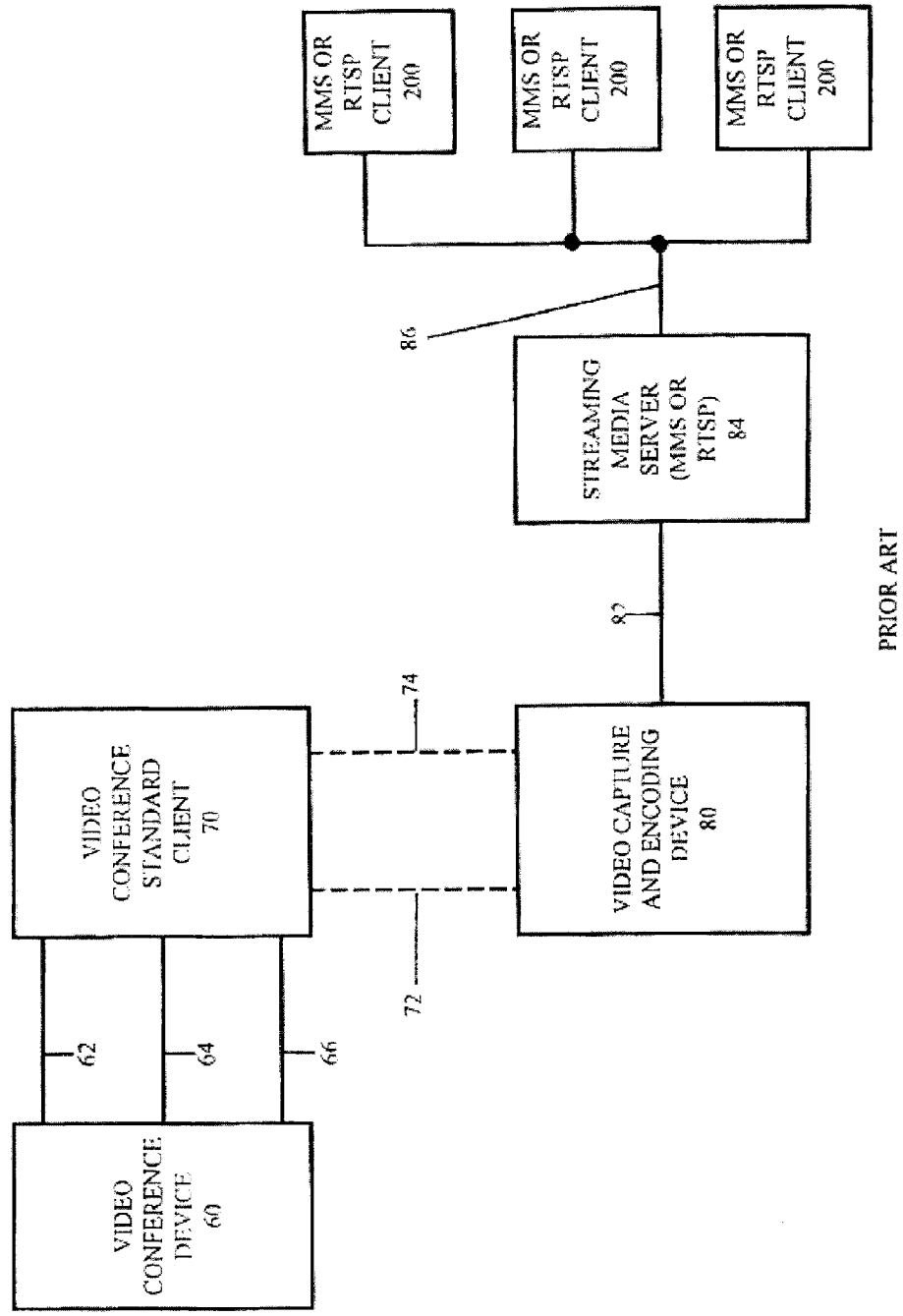
FIG. 1 is a block diagram illustrating one exemplary embodiment of a conventional system for porting video conference audio and video data streams to a distributed network.

As mentioned above, conventional video conference broadcasters re-encode the audio and video portions of the video conference through one of two techniques. As shown in FIG. 1, a video conference end point device 60 implementing a video conference session outputs three data signals 62–66 to a video conference standard client 70 of the conventional video conference broadcasting system. The three paths of data 62–66 include a video conference standard messaging signal 62, a digital video signal 64, and a digital audio signal 66. It should be appreciated that each of the video signals 62–66 are bi-directional between the video conference end point device 60 and the client 70. Each of the digital video conference standard messaging signal 62, the digital video signal 64 and the digital audio signal 66 are transmitted between the video conference end point device 60 and the client 70 using an Internet protocol (IP) packet transport method. It should also be appreciated that the digital video signal 64 and the digital audio signal 66 are transmitted between the video conference end point device 60 and the client 70 using the Internet Engineering Task Force (IETF) Real Time Protocol (RTP).

The video conference standard client 70 converts the digital video signal 64 into an analog composite video signal 72. The video conference standard client 70 also converts the digital audio signal 66 into a analog line-level audio signal 74, which are output to a video capture and encoding device 80. It should be appreciated that the analog composite video signal 72 and the analog line-level audio signal 74 are unidirectional signals from the video conference standard client 70 to the video capture and encoding device 80.

The video capture and encoding device 80 captures the analog video frames within the analog video signal 72 and digitizes the analog audio signal 74. The video capture and encoding device 80 then generates, from the captured analog video frames and the digitized audio signal, digital video signals and audio signals and encodes the digital video and audio signals as video and audio streams, or a combined audio/video data stream, for transmission over a distributed network such as the Internet. In particular, the video capture and encoding device 80, depending on the particular streaming software to be used, encodes and packetizes the digitized audio and video data using different formats based on the selected streaming software to be used. For example, Microsoft and Real Networks use proprietary, closed-system encoding and transmission protocols.

In contrast, Apple has developed the open system named "QuickTime", while the Internet engineering task force (IETF) has developed the Real Time Streaming Protocol (RTSP). Any of these open-system or closed-system encoding and packetizing methods can be used by the video capture and encoding device 80 to convert the analog data received from the video conference standard client 70 into digital data suitable for transmission over a distributed network. The video capture and encoding device 80 then outputs the digitized and packetized video and audio data streams 82 to a streaming media server 84.

The streaming media server 84, which for example, can output the digitized and packetized audio and video data as a unicast audio/video data stream 86 using the Microsoft® Windows® Media Server Protocol (Windows® MMS) or the Real Time Streaming Protocol (RTSP). The output video/audio stream 86 can then be received by any number of clients 300 connected to the distributed network over which the audio/video stream 86 is distributed.

Figure 2:
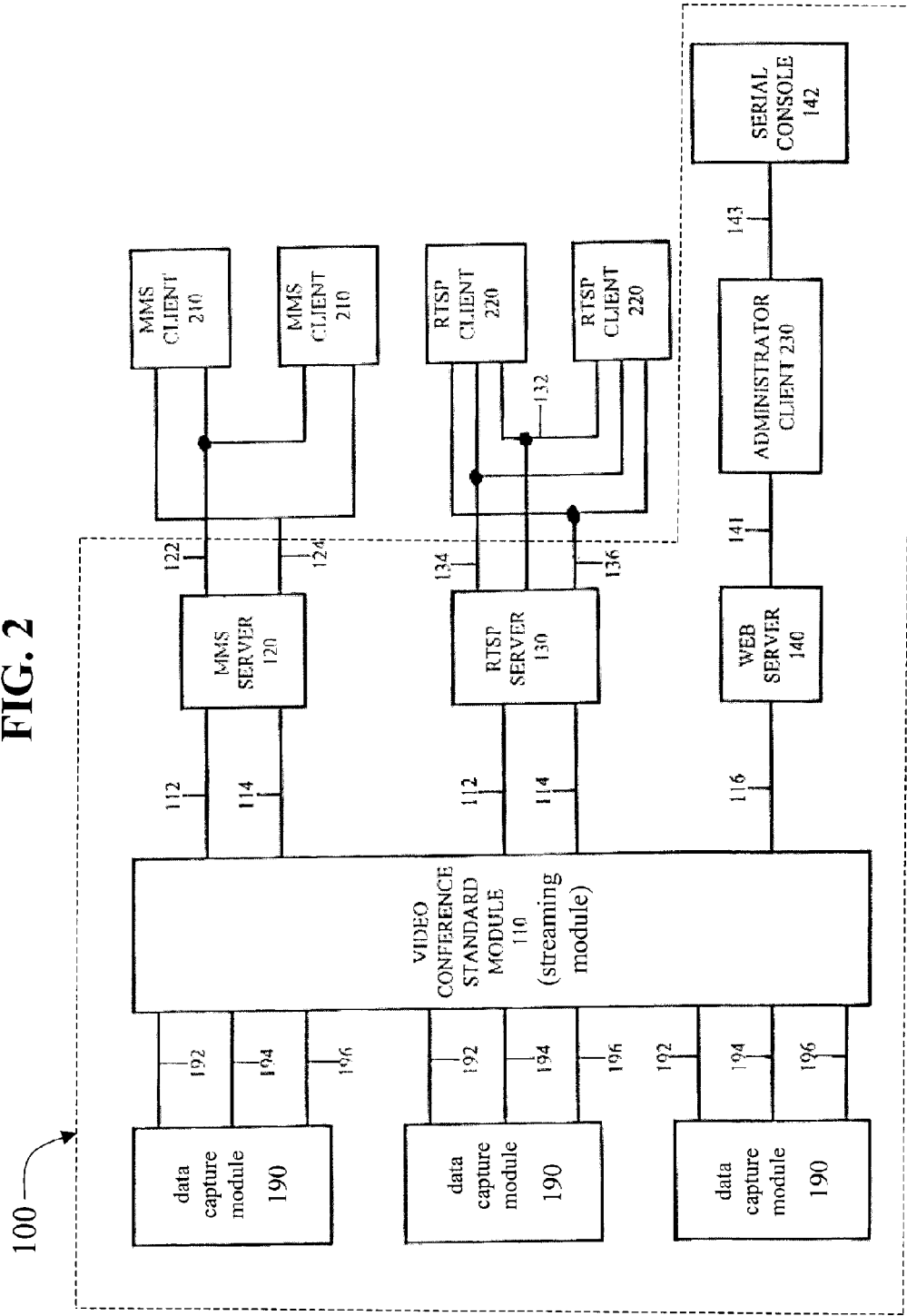
FIG. 2 is a block diagram illustrating a first exemplary embodiment of a video conference access system usable to connect a video conference session to a distributed network, in accordance with various aspects of the present invention.

FIG. 2 is a block diagram illustrating a first exemplary embodiment of a video conference access system 100 usable to connect a video conference session to a distributed network, in accordance with various aspects of the present invention. As shown in FIG. 2, the video conference access system 100 includes a streaming module 110 connected to a plurality of video-conference-standard video conference end point devices (i.e., data capture modules) 190 and one or more of an MMS (or other proprietary system) server 120, an RTSP server 130 and a web server 140. If provided, the MMS (or other proprietary system) server 120 is connected over a messaging channel 122 and outputs audio/video streams 124 to one or more MMS (or other proprietary system) clients 210. The RTSP server 130 is connected over an RTSP messaging channel 132, and outputs video streams 134 and audio streams 136 to one or more RTSP clients 220.

A web server 140 is connected over a link 141 to an administrator client 230, which is also connected over a link 143 to a serial console 142. In particular, it should be appreciated that the administrator client 230 and the other clients 210 and 220 are not necessarily part of the video conference access system 100, while the web server 140 and the serial console 142 are generally part of the video conference access system 100. However, one or both of the web server 140 and the serial console 142 can be omitted from the video conference access system 100.

Each of the data capture modules 190 outputs three data signals to the streaming module 110. These data signals include a bi-directional digital video signal 194 and a unidirectional digital audio signal 196. In particular, each of the video and audio signals are encoded using the real time protocol (RTP). Each of the signals 192–196 are transmitted between the data capture module 190 and the streaming module 110 using an Internet protocol (IP) packet transport technique. It should be noted at this point that the video conference standard video conference end point devices (i.e., data capture modules) 190 are not associated with actual human participants of the video conference but are, instead, pseudo-participant end point units which are described later herein. These pseudo-participant end point units 190 are connected into one or more video conference sessions via a multi-point control unit or an end point device that is associated with an actual human participant of a video conference session.

Each of the provided servers 120 and 130 receive unidirectional digital video streams 112 and unidirectional audio streams 114 from the streaming module 110. Each of these data streams 112 and 114 is transmitted using an internal digital transport technique. The streaming module 110 communicates with the web server 140 using a bi-directional digital messaging stream 116. This digital messaging stream 116 is also transmitted using the internal digital transport method discussed above with respect to the data streams 112 and 114. In various exemplary embodiments, the bi-directional digital messaging stream 116 uses a proprietary protocol.

It should be appreciated that, while various ones of the channels and streams are variously described herein as bi-directional or unidirectional, in various exemplary embodiments, each of the channels disclosed herein as bi-directional can be replaced with one or more unidirectional channels or streams. Likewise, each unidirectional channel or stream can be implemented as two or more unidirectional channels or streams, and each bi-directional channel or stream can be implemented as two or more bi-directional channels or streams.

Figure 3:
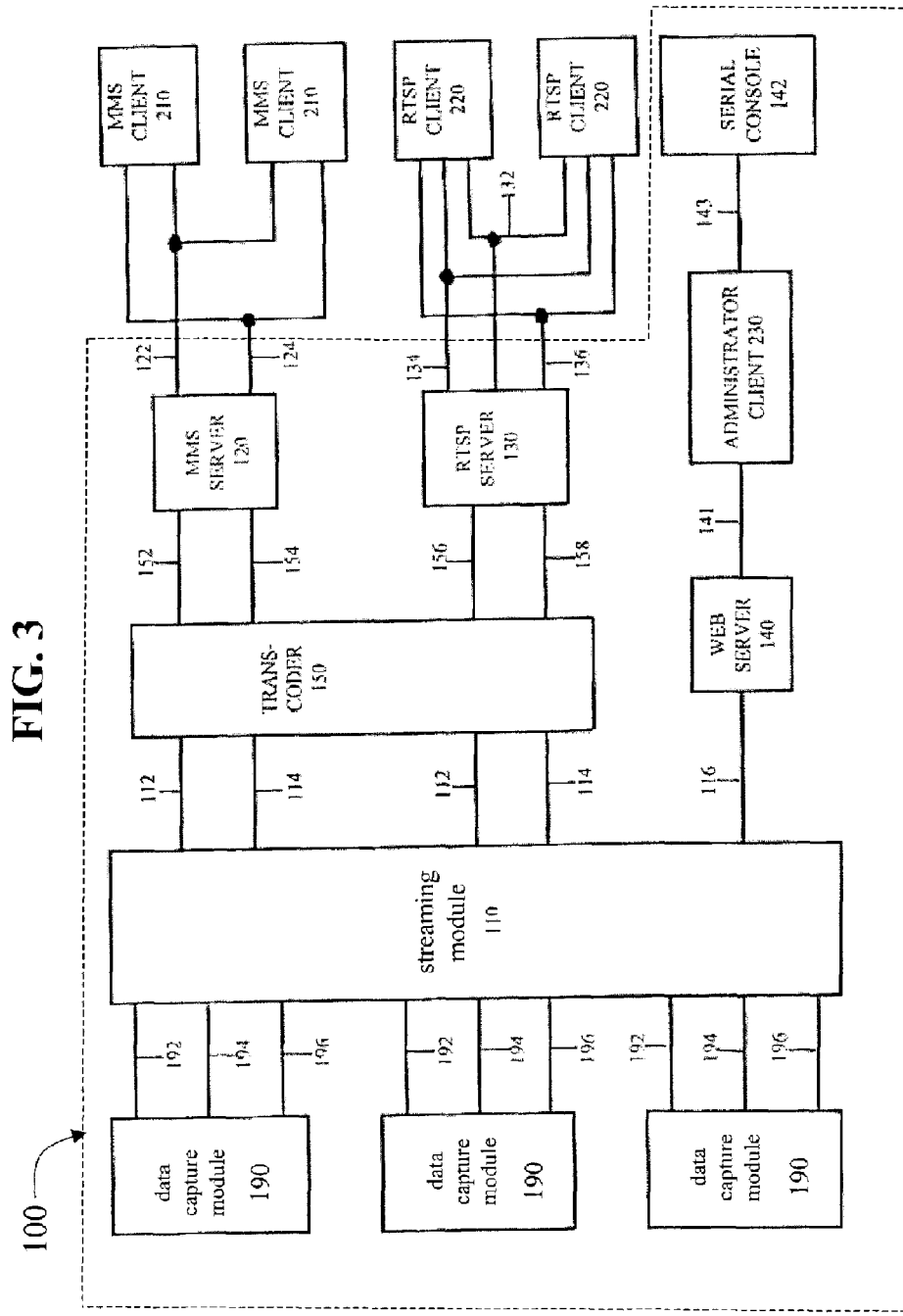
FIG. 3 is a block diagram illustrating a second exemplary embodiment of the video conference access system usable to connect a video conference session to a distributed network, in accordance with various aspects of the present invention.

FIG. 3 is a block diagram illustrating a second exemplary embodiment of the video conference access system 100 usable to connect a video conference session to a distributed network, in accordance with various aspects of the present invention. The second exemplary embodiment shown in FIG. 3 is generally the same as the first exemplary embodiment shown in FIG. 2. However, in the second exemplary embodiment, a transcoder 150 has been inserted between the streaming module 110 and the MMS server 120 and RTSP server 130. The transcoder 150 converts the audio and video data streams 112 and 114 received from the streaming module 110 from the form output by the streaming module 110 to one or more different video and audio streams 152 and 154 usable by various ones of the clients 210 and/or 220.

In general, there are a number of different encoding techniques that can be used to compress or encode the video and audio streams 112 and 114 for transmission as digital data over a distributed network. For example, there are at least two common video compression or encoding techniques, while there are at least 4 or 5 common audio compression or encoding techniques. For this reason, some clients may be set up to use a different compression or encoding technique than those used to compress or encode one or both of the video and audio streams 112 and 114.

In this case, if that client received the compressed or encoded video and audio streams 112 and 114 directly from the streaming module 110, that client would not be able to decompress or decode one or both of the video or audio streams 112 and 114. Similarly, the bit rate of one or both of the video and audio streams 112 and 114 as output by the streaming module 110 may not match the bit rate required or desired by various clients 210 and/or 220.

The transcoder 150 decompresses or decodes the video and audio streams 112 and 114 output from the streaming module 110 and recompresses or re-encodes the video and audio streams 114 into one or more different forms as the separate video and audio streams 152 and 154, and 156 and 158. Each of these different streams 152–158 can use a different video or audio compression or encoding technique and/or use a different bit rate. Additionally, one or more of these different streams 152–158 can use the same video and audio compression or encoding techniques and bit rate as the corresponding video and/or audio streams 112 and 114. Each of these different forms of the transcoded video and audio streams 152–158 are output to one or both of the MMS server 120 and/or the RTSP server 130.

Each of the different forms of the audio and video streams 152–158 provided to the MMS server 120 and the RTSP server 130 can be accessed by the clients by transmitting a unique identifier, such as a specific uniform resource locator (URL), to one of the servers 120 or 130. Thus, for example, to access a particular set of the video and audio streams 152–158, a user would transmit a specific identifier associated with that particular set to one of the MMS server 120 or the RTSP server 130. In response, the MMS server 120 or the RTSP server would unicast that particular set of video and audio streams 152–158 to that user. In various exemplary embodiments, the specific identifier and the particular set of video and audio streams 152–158 that identifier is associated with are displayed to the user on a web page that is associated with the particular video conference session the user wishes to view. In this case, the user transmits the specific identifier to the MMS server 120 or the RTSP server 130 by selecting and activating an associated hyperlink.

Figure 4:
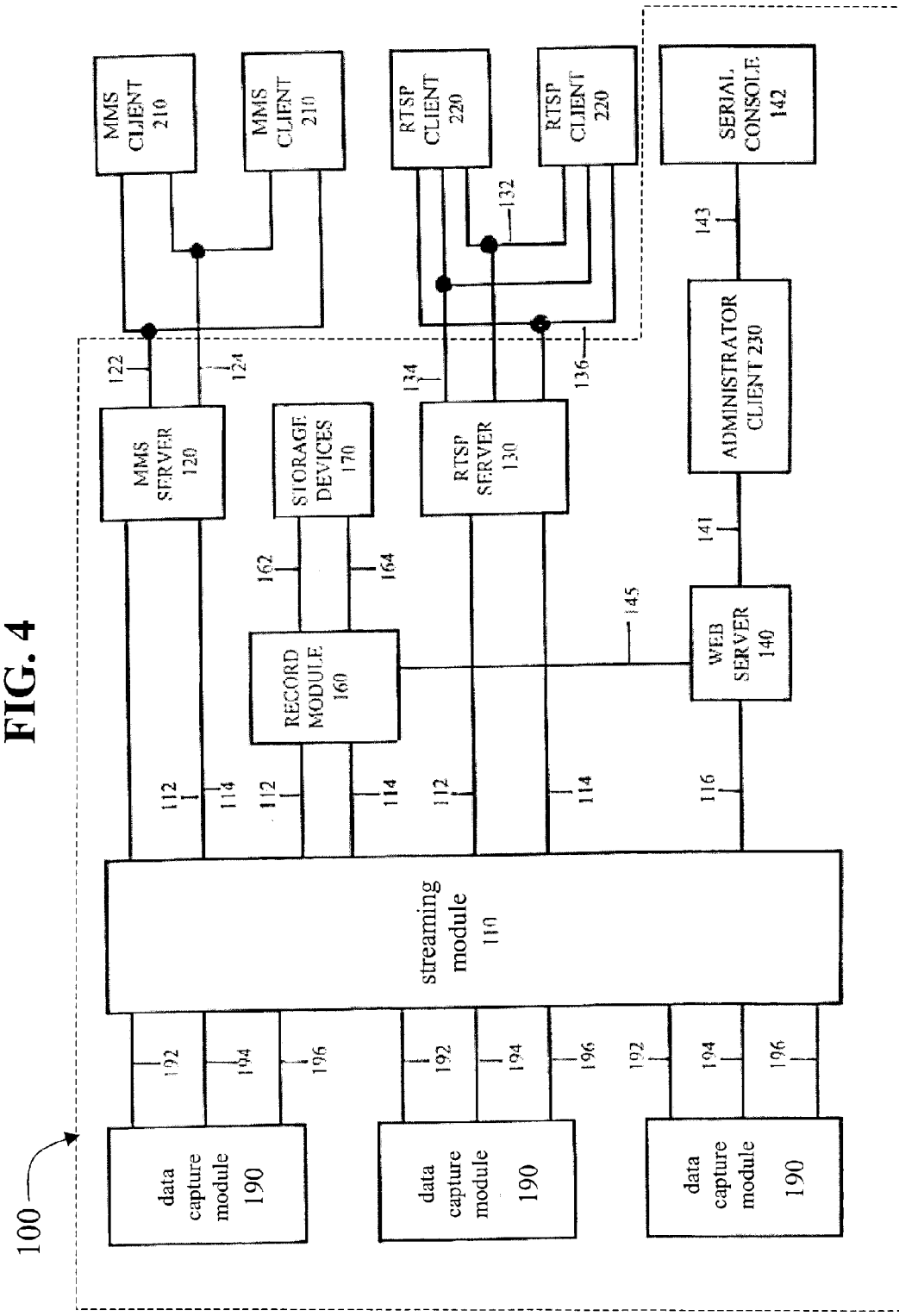
FIG. 4 is a block diagram illustrating a third exemplary embodiment of the video conference access system usable to connect a video conference session to a distributed network, in accordance with various aspects of the present invention.

FIG. 4 is a block diagram illustrating a third exemplary embodiment of the video conference access system 100 usable to connect a video conference session to a distributed network, in accordance with various aspects of the present invention. The third exemplary embodiment shown in FIG. 4 is generally the same as the first exemplary embodiment shown in FIG. 2. However, in the third exemplary embodiment, a record module 160 and one or more storage devices 170 have been connected to the streaming module 110. The record module 160 allows the video and audio streams 112 and 114 to be recorded. Thus, the video and audio streams 112 and 114 can be played back to a client after the video conference session has begun, and even after the video conference session has ended.

Alternately, a portion of the video and audio streams 112 and 114 stored in one or more of the one or more storage devices 170 can be read and played back by the record module 160 to the streaming module 110 and through the streaming module 110 to the video-conference-standard video conference devices 190. In this way, a previous portion of the video conference can be played back to the participants in the video conference session. This could be useful if there was a dispute over what had previously occurred during the video conference session, or if a participant was absent during a particular portion of the video conference session.

Finally, the record module 160 and the one or more storage devices 170 can receive and store other electronic data uploaded by one of the clients 210 or 220 through the MMS server 120 or the RTSP server 130, respectively, to the streaming module 110. Then, like a recorded portion of the video conference, this uploaded electronic data can be transmitted by the record module 160 to the streaming module 110 and through the streaming module 110 to the video conference standard video conference devices 190. In this way, the uploaded electronic data can be displayed to the participants in the video conference session.

The one or more storage devices 170 can include one or more locally located physical storage devices, such as a hard disk, RAM, flash memory, a writeable or re-writeable optical disk, or any other known or later-developed locally located storage device, that is locally implemented, for example, as part of the streaming module 110 and/or the record module 160. Similarly, the one or more storage devices 170 can include one or more remotely located storage devices, such as a storage server, or any other known or later-developed remotely located storage device that is accessed by the record module 160 over a distributed network. Furthermore, the one or more storage devices 170 can include both one or more locally-located storage devices, and one or more remotely-located storage devices.

Figure 5:
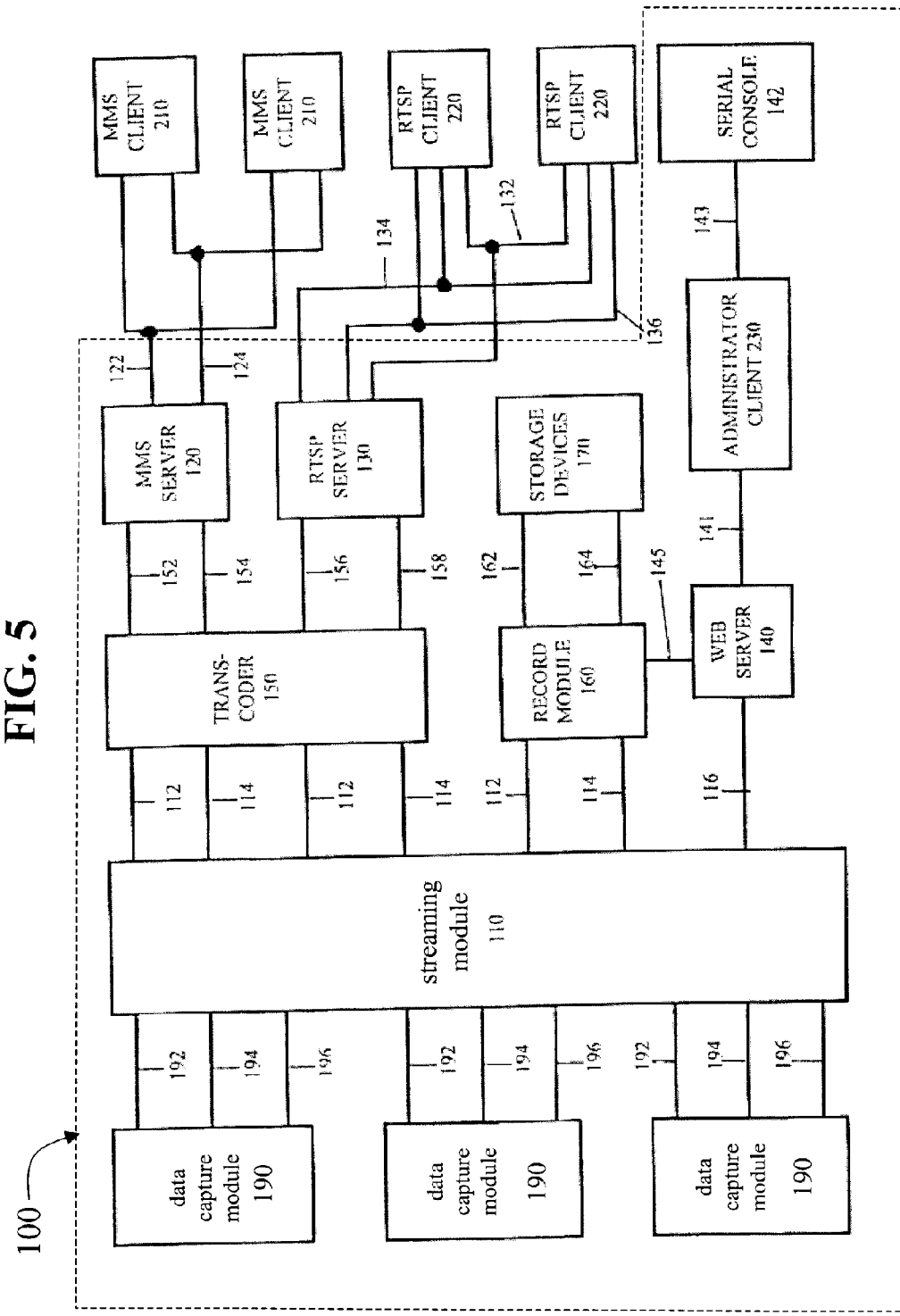
FIG. 5 is a block diagram illustrating a fourth exemplary embodiment of the video conference access system 100 usable to connect a video conference session to a distributed network, in accordance with various aspects of the present invention.

FIG. 5 is a block diagram illustrating a fourth exemplary embodiment of the video conference access system 100 usable to connect a video conference session to a distributed network, in accordance with various aspects of the present invention. The fourth exemplary embodiment shown in FIG. 5 is generally the same as the first exemplary embodiment shown in FIG. 2. However, in the fourth exemplary embodiment, both the transcoder 150, described above with respect to FIG. 3, has been inserted between the streaming module 110 and the MMS server 120 and the RTSP server and the record module 160 and the one or more storage devices 170, described above with respect to FIG. 4, have been connected to the streaming module 110.

As outlined above with respect to FIG. 1, the conventional system shown in FIG. 1 piggy backs on the video conference end point device 60 used by one of the video conference participants. That is, the video conference end point device 60 is the end point of one of the video conference participants. The video conference standard client 70 is thus used both by the video conference participants to convert the digital audio and video streams into analog format so that the video conference video and audio streams can be presented to the video conference participants. The video capture and encoding device 80 piggy backs on these analog signals and reconverts them back into digital format.

In contrast, in the various exemplary embodiments of the systems and methods according to the present invention, such as those outlined above with respect to FIGS. 2–5, the data capture module 190 of the video conference access system 100 is not the video conference device used by one of the actual participants to the video conference. Rather, the data capture module 190 of the video conference access system 100, according to various embodiments of the present invention, separately interacts with the particular multi-point control unit for a particular video conference in the same way that the video conference end point devices 60 of the actual participants interact with the multi-point control unit. Thus, in general, although not necessarily, the data capture module 190 is not an active participant in that particular video conference session, and does not actively transmit video and audio data to the multipoint control unit as is done by the video conference end point devices 60 of the active participants. Thus, the data capture module 190 acts as a "pseudo-participant" within that particular video conference session.

This provides several distinct advantages over the conventional system illustrated in FIG. 1. Initially, like any video conference participant, the data capture module 190 can be located anywhere relative to the other video conference participants. Thus, the streaming module 110, unlike the video capture and encoding device 80, is not limited to being located in the same room, or even the same physical structure, as the video conference equipment of one of the participants to the video conference session.

Additionally, because the data capture module 190 does not have to have any specific relationship to the other video conference participants, multiple data capture modules 190 can be connected to the streaming module 110 and act as "pseudo-participants" to a variety of different video conference sessions at the same time. Thus, the video conference access system 100 acts as a video-conference-standard video conferencing network appliance. The video conference access system 100 can work with any Internet protocol (IP)-based video conference standard network, or even, via an ISDN to video conference standard gateway, with H.320 video conferencing systems. The video conference access system 100 connects with other video-conference-standard video conferencing equipment like any other end point device. This allows an end point device 60 to connect to one of the data capture modules 190 directly, or for one of the data capture modules 190 to connect to a multi-point conference through the multi-point control unit 70.

The streaming module 110 of the video conference access system 100 takes advantage of existing encoded video and audio data that is already being transmitted between the participants of the particular video conference session. The data capture module 190 acts as a "pseudo-participant" to capture, extract, and re-encode existing encoded video data for use by conventional streaming media players.

In various exemplary embodiments, the unicast servers include servers able to output unicast multimedia data streams using the Microsoft® Windows® Media Player®, the Apple® QuickTime® player, the Real Networks® Real® player, or the like. The streaming module 110 takes advantage of the high-quality video compression hardware present in the data capture module 190. In general, due to the video and audio data remaining in digital format from the time the video and audio signals are received by the data capture module 190 until the video and audio streams are transmitted to the clients 210 and 220, there is little to no latency caused by the video conference access system 100, such as that caused by the software digitizing and encoding used in the conventional system shown in FIG. 1.

Moreover, because the clients 210 and 220 receive the exact video and audio content that the participants to the video conference session experience, the experience of the users of the clients 210 and 220 is enhanced relative to the experience of the users of the clients 200 that access the system shown in FIG. 1.

Figure 6:
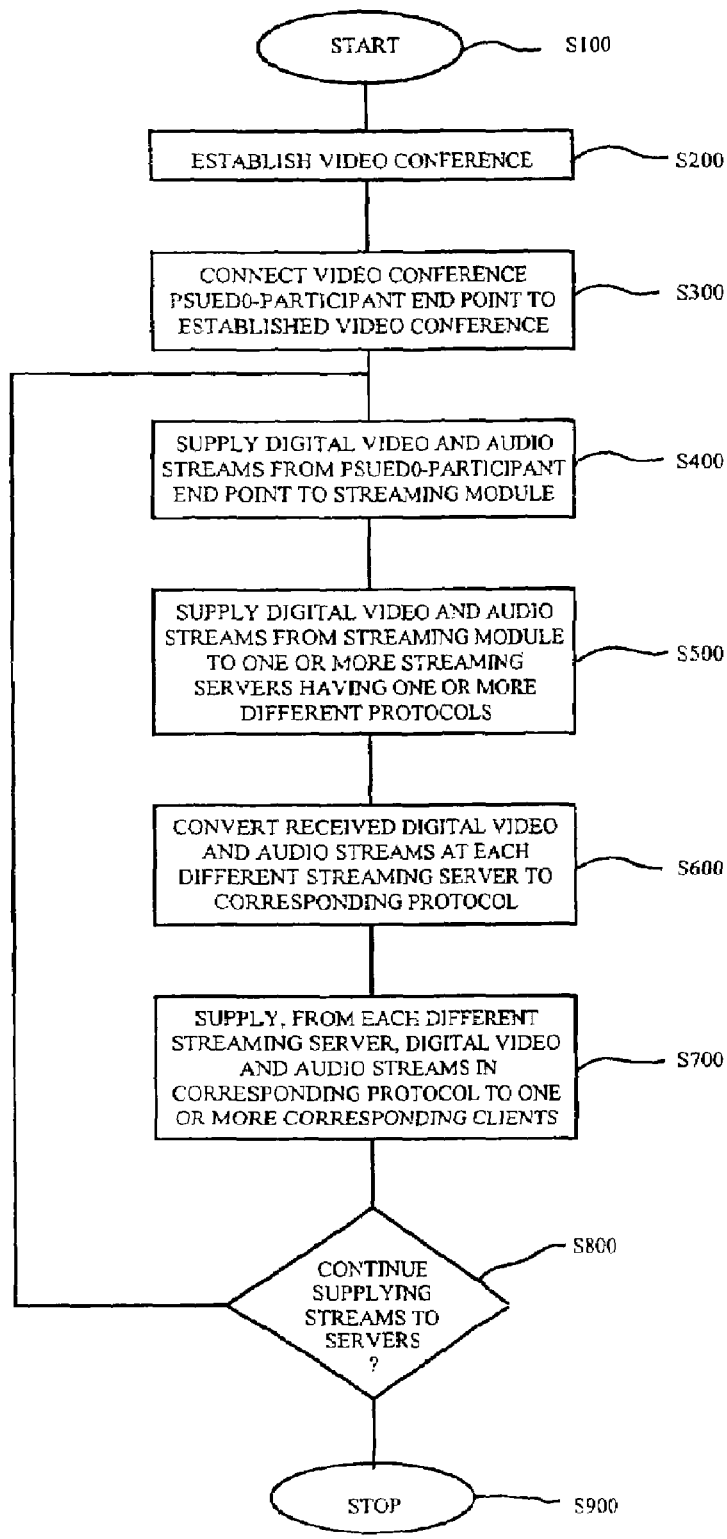
FIG. 6 is a flowchart outlining a first exemplary embodiment of a method for distributing the video and audio digital data content of a video conference session as a multimedia data stream over a distributed network, in accordance with various aspects of the present invention.

FIG. 6 is a flowchart outlining a first exemplary embodiment of a method for distributing the audio and video digital data content of a video conference session as a multimedia data stream over a distributed network, in accordance with various aspects of the present invention. Beginning in step S100, operation continues to step S200, where a video conference session (using a video conference standard protocol technique) to be distributed as a multimedia data stream over a distributed network (using a multimedia streaming protocol technique) is established between two or more video conference end point devices, if a peer-to-peer system is used, or between two or more video conference end point devices and a multipoint control unit. Next, in step S300, a data capture module (i.e., a pseudo-participant end point unit), in accordance with an embodiment of the present invention, is connected to the established video conference session. Then, in step S400, the digital video and audio signals of the video conference session are supplied from the data capture module to a streaming module. Operation then continues to step S500.

In step S500, the digital video and audio streams supplied to the streaming module are converted and re-supplied to one or more streaming servers that have one or more different protocols (i.e., multimedia streaming protocols). These servers include, but are not limited to, servers able to output unicast multimedia data streams using the Microsoft® Windows® Media Server (Windows® MMS), the Apple® QuickTime® protocol, the Real Networks® Real® protocol, the Internet Engineering Task Force (IETF) Real Time Streaming Protocol (RTSP), or any other known or related developed multimedia streaming protocol. It should be appreciated that, as outlined above with respect to FIGS. 3 and 5, in step S500, supplying the digital video and audio streams from the streaming module to the one or more streaming servers can comprise supplying the particular digital video and audio streams to a particular streaming server at different audio and/or video compression rates and/or using different audio and/or video compression and/or encoding techniques.

Then, in step S600, each of the streaming servers converts the supplied digital video and audio streams provided to that particular streaming server into the corresponding protocol implemented by that streaming server. Next, in step S700, each different streaming server supplies the converted digital audio and video streams, now in the multimedia streaming protocol corresponding to that particular streaming server, to one or more corresponding clients. Operation then continues to step S800.

In step S800, a determination is made whether the digital video and audio signals should continue to be captured from the video conference session and supplied through the pseudo-participant end point unit and the streaming module to the streaming servers. If so, operation jumps back to step S400. Otherwise, operation continues to step S900, where the method ends.

Figure 7:
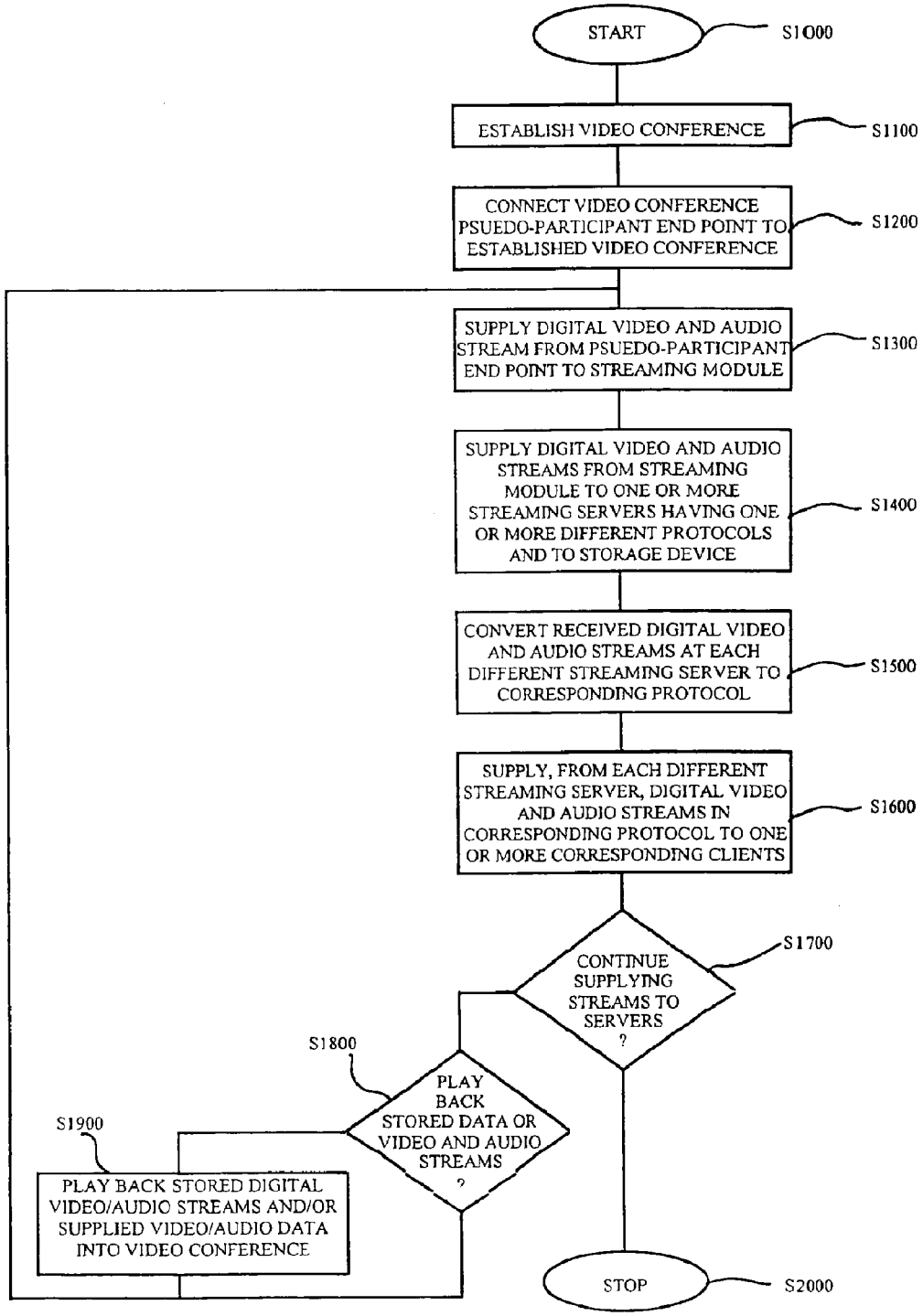
FIG. 7 is a flowchart outlining a second exemplary embodiment of a method for distributing the video and audio digital data content of a video conference session as a multimedia data stream over a distributed network, in accordance with various aspects of the present invention.

FIG. 7 is a flowchart outlining a second exemplary embodiment of a method for distributing the audio and video digital data content of a video conference as a multimedia data stream over a distributed network, in accordance with various aspects of the present invention. As shown in FIG. 7, beginning in step S1000, operation continues to step S1100, where a video conference session is established. Then, in step S1200, a data capture module (i.e., a pseudo-participant end point unit) is connected to the established video conference session. Next, in step S1300, the digital video and audio signals from the data capture module are supplied to the streaming module. Operation then continues to step S1400.

In step S1400, the digital video and audio streams from the streaming module are supplied to one or more streaming servers having one or more different protocols, as well as to a storage device that stores the digital video and audio streams. Next, in step S1500, the received digital video and audio streams received at each different streaming server are converted to the protocol corresponding to that streaming server. Then, in step S1600, the converted digital audio and video streams are supplied, from each different streaming server, in the various protocols corresponding to the different streaming servers, to one or more corresponding clients. Operation then continues to step S1700.

In step S1700, a determination is made whether the video conference session continues to supply the video and audio data signals to the streaming module, and thence to the different streaming servers. If so, operation continues to step S1800. Otherwise, operation jumps to step S2000.

In step S1800, a determination is made whether or not to play back any of the portions of the video and audio streams of the video conference session that have been stored in the storage device in step S1400, or to play back any other data that may have been uploaded and/or stored in the storage device. If so, operation continues to step S1900. Otherwise operation jumps back to step S1300. In step S1900, the stored digital video and/or audio streams and/or the supplied video and/or audio data stored in the storage device is played back into the current video conference session. Operation then again jumps back to step S1300. In contrast, in step S2000, the operation of the method ends.

In various exemplary embodiments of the video conference access system 100 shown in FIGS. 2–5, the various software and hardware elements are supported by a Linux kernel that provides the network resources. The small operating system footprint and versatile network stack provided by the Linux kernel work exceptionally well with the video conference standard stack. Thus, the streaming module 110 is able to seamlessly connect the video conference audio and video digital signals to Internet protocol (IP)-based networks.

Linux has been proven, in a significant number of embedded devices, to be an extremely functional real time operating system, while still providing necessary system resources. The high performance of Linux in a small specialized device provides the ability to ensure that the video conference access system 100 will be able to meet both present and future streaming media requirements in a fully scalable fashion.

In various exemplary embodiments, the administrator client 230 allows an administrator to grant or deny permission to a user to view a broadcast. This allows the IT manager or a video conference coordinator to maintain full control over the distribution of proprietary and/or confidential information, while still allowing the transition from conventional media distribution to modern Internet-based content delivery technologies.

The data capture module 190, the streaming module 110, the transcoder 150, the record module 160 and/or the clients 142, 210 and/or 220 of the various exemplary embodiments of the video conference access system 100 may be implemented on one or more programmed general purpose computers. However, the data capture module 190, the streaming module 110, the transcoder 150, the record module 160 and/or the clients 142, 210 and/or 220 of the various exemplary embodiments of the video conference access system 100 can also be implemented on one or more special purpose computers, one or more programmed microprocessors or micro controllers and peripheral integrated circuit elements, one or more ASICs or other integrated circuits, one or more digital signal processors, one or more hardwired electronic or logic circuits such as a discrete element circuit, a programmable logic device such as a PLD, PLA, FPGA or PAL, or the like. In general, any device, capable of implementing a finite state machine that is in turn capable of implementing the flowcharts shown in FIGS. 6 and 7, can be used to implement the data capture module 190, the streaming module 110, the transcoder 150, the record module 160 and/or the clients 142, 210 and/or 220 of the various exemplary embodiments of the video conference access system 100.

It should be understood that each of the data capture module 190, the streaming module 110, the transcoder 150, the record module 160 and/or the clients 142, 210 and/or 220 shown in FIGS. 2–5 can be implemented as portions of a suitably programmed general purpose computer. Alternatively, each of the streaming module 110, the transcoder 150, the record module 160 and/or the clients 142, 210 and/or 220 shown in FIGS. 2–5 can be implemented as physically distinct hardware circuits within an ASIC, or using a FPGA, a PDL, a PLA or a PAL, or using discrete logic elements or discrete circuit elements. The particular form each of the streaming module 110, the transcoder 150, the record module 160 and/or the clients 142, 210 and/or 220 shown in FIGS. 2–5 will take is a design choice and will be obvious and predicable to those skilled in the art.

Moreover, the data capture module 190, the streaming module 110, the transcoder 150, the record module 160 and/or the clients 142, 210 and/or 220 can be implemented as software executing on a programmed general purpose computer, a special purpose computer, a microprocessor or the like. In this case, the data capture module 190, the streaming module 110, the transcoder 150, the record module 160 and/or the clients 142, 210 and/or 220 can be implemented as a resource residing on a server or the like. The data capture module 190, the streaming module 110, the transcoder 150, the record module 160 and/or the clients 142, 210 and/or 220 can also be implemented by physically incorporating them into a software and/or hardware system.

The storage devices 170 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system for distributing video conference data over a distributed network, said system comprising:
   a data capture module operationally connected to a video conference system to at least receive a video conference standard protocol signal, containing at least video and/or audio digital data content, from said video conference system and to extract said digital data content from said video conference standard protocol signal;
   a streaming module operationally connected to said data capture module to receive at least a portion of said extracted digital data content from said data capture module, wherein the at least a portion of the extracted digital data content is processed for handling by at least one streaming server and supplied to the at least one streaming server; and
   at least one streaming server operationally connected to said streaming module to receive said at least a portion of said digital data content from said streaming module and to output at least a portion of said digital data content in a format of at least one multimedia streaming protocol signal to at least one client on a distributed network.

2. The system of claim 1 wherein said data capture module encodes said at least a part of said video and/or audio digital data content using the real time protocol (RTP).

3. The system of claim 1 wherein said at least a part of said video and/or audio digital data content is supplied from said data capture module to said streaming module via an Internet protocol (IP) packet transport technique.

4. The system of claim 1 wherein said streaming module processes the at least a portion of the extracted digital data content according to at least one of modifying a bit rate, an encoding, and a compression as part of supplying said at least a portion of said video and/or audio digital data content to said at least one streaming server.

5. The system of claim 1 wherein said at least a portion of said video and/or audio digital data content is supplied from said data capture module to said streaming module and to said at least one streaming server without conversion to analog.

6. The system of claim 1 further comprising at least one storage device for storing at least a part of said video and/or audio digital data content.

7. The system of claim 6 wherein said streaming module injects at least a part of said stored video and/or audio digital data content back into the video conference system.

8. The system of claim 6 wherein said streaming module supplies at least a part of said stored video and/or audio digital data content as at least a part of said at least a portion of said video and/or audio digital data content supplied to said at least one streaming server.

9. The system of claim 6 wherein said at least one storage device further stores data originating from outside said video conference system.

10. The system of claim 9 wherein said streaming module injects into said video conference system at least a portion of said outside data stored in said at least one storage device.

11. The system of claim 1 further comprising a transcoder, and wherein said streaming module supplies at least said portion of said video and/or audio digital data content to said transcoder.

12. The system of claim 11 wherein said transcoder creates at least one different form of said at least a portion of said video and/or audio digital data content.

13. The system of claim 12 wherein said transcoder supplies at least one of said created at least one different form to at least one streaming server.

14. The system of claim 12 wherein the transcoder supplies, for each streaming server, at least one of 1) said at least a portion of said video and/or audio digital data content, and 2) an altered form of said at least a portion of said video and/or audio digital data content.

15. The system of claim 12 wherein the transcoder alters, for each different form of said at least a portion of said video and/or audio digital data content, a compression and an encoding of said at least a portion of said video and/or audio digital data content.

16. The system of claim 1 wherein said data capture unit, said streaming module, and said at least one streaming server exist as a single integrated hardware unit with associated software.

17. The system of claim 1 wherein said streaming module and said at least one streaming server exist as a single integrated hardware unit with associated software.

18. The system of claim 1 wherein said at least a portion of said video and/or audio digital data content is supplied from said streaming module to said at least one streaming server using an internal digital transport technique.

* * * * *